US007619879B2

(12) United States Patent
Aoyama et al.

(10) Patent No.: US 7,619,879 B2
(45) Date of Patent: Nov. 17, 2009

(54) LAPTOP DUAL-SWIVEL HINGES

(75) Inventors: Noboru Aoyama, Sagamihara (JP); Yasunori Maezawa, Sagamihara (JP); Nariaki Mieki, Sagamihara (JP); Shigeki Mori, Yamato (JP); Aaron M. Stewart, Raleigh, NC (US)

(73) Assignee: Lenovo Singapore Pte Ltd., Singapore (SG)

( * ) Notice: Subject to any disclaimer, the term of this patent is extended or adjusted under 35 U.S.C. 154(b) by 0 days.

(21) Appl. No.: 12/040,806

(22) Filed: Feb. 29, 2008

(65) Prior Publication Data

US 2009/0231791 A1 Sep. 17, 2009

(51) Int. Cl.
*G06F 1/16* (2006.01)

(52) U.S. Cl. ........................... 361/679.06; 361/679.07; 361/679.27; 361/679.28; 248/920; 248/923

(58) Field of Classification Search ......... 361/680–683, 361/679.06; 248/917–923; 312/223.1, 223.2
See application file for complete search history.

(56) References Cited

U.S. PATENT DOCUMENTS

| | | | | |
|---|---|---|---|---|
| 6,883,206 | B2 * | 4/2005 | Yang et al. | 16/337 |
| 6,912,122 | B2 * | 6/2005 | Chen et al. | 361/681 |
| 7,133,280 | B2 * | 11/2006 | Love | 361/681 |
| 2005/0079897 | A1 * | 4/2005 | Nishijima et al. | 455/575.1 |
| 2005/0207104 | A1 * | 9/2005 | Love | 361/683 |
| 2006/0203440 | A1 * | 9/2006 | Lev et al. | 361/683 |
| 2007/0285883 | A1 * | 12/2007 | Nakajima et al. | 361/683 |
| 2008/0253072 | A1 * | 10/2008 | Tracy et al. | 361/681 |
| 2008/0261666 | A1 * | 10/2008 | Niitsu et al. | 455/575.4 |

* cited by examiner

*Primary Examiner*—Jayprakash N Gandhi
*Assistant Examiner*—Anthony Q Edwards
(74) *Attorney, Agent, or Firm*—Ference & Associates

(57) ABSTRACT

In a convertible notebook/tablet computer with a dual-swivel hinge, an arrangement for communicating to a user a preferred rotational direction for pivoting about a z-axis, entirely without wiring or lights and in a manner such that at most only one rotational direction is communicated at a time. Preferably, this is accomplished via one or more windows, disposed on a surface of the hinge, that permit an arrow to be visible in accordance with a preferred rotational direction that a user needs to pivot the monitor/lid with respect to the keyboard based on the rotational direction originally traversed.

15 Claims, 9 Drawing Sheets

129a
122
124
120b
120a
Z
224
222
224a
227
225
230
226
229
212
232

LAPTOP DUAL-SWIVEL HINGES

FIELD OF THE INVENTION

The present invention relates generally to laptop computers, and particularly to convertible tablet/notebook computers with dual-swivel hinges.

BACKGROUND OF THE INVENTION

Convertible tablet/notebook computers are well known; these are portable, "laptop" sized computers that are able to selectively convert between a "notebook" mode and a "tablet" mode. In a "notebook" mode, similar to standard operation of a laptop computer, a monitor is typically pivotable with respect to a keyboard, whereby in a "closed" position of the computer the monitor is face down towards the keyboard. Thus, an opposite face of the monitor portion of the computer serves as a lid.

In a "tablet" mode, on the other hand, the monitor/lid component is disposed essentially adjacent and parallel to the keyboard, but the monitor faces away from the keyboard, or towards an exterior of the computer, where it can be accessed by a user in a known manner associated with tablet computers. For instance, the user might be able to manipulate data or windows or other items on the monitor via touching the monitor screen or using a stylus, and/or may be able to write directly on the screen by way of a stylus. Thus, the "lid" side of the monitor/lid portion will now be disposed face down and towards the keyboard, and the keyboard is essentially inaccessible to the user in "tablet" mode.

To mechanically switch between "notebook" and "tablet" mode and back, there is generally provided a multi-axis hinge that allows the monitor to rotate between notebook and tablet mode about a "z-axis". The z-axis in this case is associated with the monitor/lid portion and runs in perpendicular to the usual hinge axis (or axis about which pivotal displacement takes place, normally termed the "y-axis") between the monitor/lid portion and keyboard. Thus, the z-axis is vertical with respect to the plane of the keyboard when the monitor/lid portion is held vertical and at a 90 degree angle with respect to the keyboard. The multi-axis hinge, of course, also permits the usual pivoting of a monitor/lid with respect to a keyboard about the aforementioned y-axis (i.e., as would normally take place in most conventional laptop computers between "open" and "closed" positions of the monitor/lid with respect to the keyboard).

Conventionally, there are two general categories of a multi-axis hinge: a single-swivel hinge which allows pivoting in only one direction about the z-axis when pivoting the monitor between notebook and tablet mode; and a dual-swivel hinge which allows pivoting of the monitor in both rotational directions about the z-axis when pivoting the monitor between notebook and tablet mode. In other words, with a single-swivel hinge, the monitor/lid can only be pivoted in one rotational direction as it goes from notebook to tablet mode and thence only in the opposite rotational direction as it goes from tablet to notebook mode. On the other hand, with a dual-swivel hinge, the monitor/lid can be pivoted in either rotational direction as it goes from a first mode (notebook or tablet) to a second mode (the other of notebook or tablet). However, conventional dual-swivel hinges have significant problems and limitations.

Generally, with a dual-swivel hinge, when transitioning back from a "second mode" to a "first mode", it is very important to pivot the monitor/lid about the z-axis in a rotational direction opposite from that in which pivoting took place to arrive at the "second mode" from the "first mode". Particularly, wires and/or other connectors normally run through the dual-swivel hinge along the z-axis, so that excessive pivoting of the monitor/lid with respect to the keyboard in either rotational direction could jeopardize the integrity of these wires or connectors. (As such, the 180 degrees of pivoting about the z-axis permitted in either direction, as alluded to hereinabove, is normally recognized as the maximum reasonable pivotal displacement that the monitor/lid portion can undergo with respect to the keyboard without jeopardizing the integrity of the connectors or wires that run through the hinge.) Without further guidance for the user, it is easy for a user to forget the rotational direction which was originally traversed to arrive at the "second mode" from the "first mode" and that must be traversed in opposite to return to the "first mode" from the "second mode"; for instance, enough time might elapse whereby it is easy for a user to forget this information, or the user's memory may well fail him or her in light of needing to focus on more pressing items.

Accordingly, it has been recognized that it is useful to provide a user with an indication of the rotational direction in which reverse pivotal movement (or return pivotal movement) from the second mode to the first mode must occur. At present, conventional solutions involve hard-printed (i.e., static) labeling in different locations and light indicators (LEDs) that are lit at appropriate times. The "static" solutions have been noted as being quite confusing, as different rotational directions are indicated simultaneously and can thus be seen simultaneously by the user, possibly leading to more confusion. The light-based solutions, on the other hand, tend to be installed at great cost and require an added level of structural complexity that might not be desired in a computer and may be regarded offhand as an unneeded or frivolous expense as compared to the costs of other, more critical, computer components.

In view of the foregoing, a need has thus been recognized in connection with providing an arrangement, for communicating to a convertible tablet/notebook user a preferred rotational direction for pivoting about a z-axis, which is cost-effective and efficient.

SUMMARY OF THE INVENTION

In accordance with a presently preferred embodiment of the present invention, there are broadly contemplated herein arrangements for communicating to a convertible tablet/notebook user a preferred rotational direction for pivoting about a z-axis, entirely without wiring or lights and in a manner such that at most only one rotational direction is communicated at a time. Preferably, this is accomplished via one or more windows, disposed on a surface of the hinge, that permit an arrow to be visible in accordance with a preferred rotational direction that a user needs to pivot the monitor/lid with respect to the keyboard based on the rotational direction originally traversed.

In summary, one aspect of the invention provides a computer comprising: a lid portion; a base portion; a dual-swivel hinge interconnecting said lid portion and said base portion, said hinge comprising: a first portion which is rotationally fixed with respect to said lid portion; and a second portion which is rotationally fixed with respect to said base portion; said first portion being rotationally displaceable with respect to said second portion between a first orientation and a second orientation about a central axis of said hinge, the first and second orientations differing in rotational position with respect to the central axis; a marking arrangement comprising: a view medium; a first marking associated with the first orientation; a second marking associated with the second orientation; and an availing arrangement which: avails said first marking to said view medium while said first portion is in the first orientation; and avails said second marking to said view medium while said first portion is in the second orientation.

Furthermore, another aspect of the invention provides a dual-swivel hinge comprising: a first portion; and a second portion; said first portion being rotationally displaceable with respect to said second portion between a first orientation and a second orientation about a central axis of said hinge, the first and second orientations differing in rotational position with respect to the central axis; a marking arrangement comprising: a view medium; a first marking associated with the first orientation; a second marking associated with the second orientation; and an availing arrangement which: avails said first marking to said view medium while said first portion is in the first orientation; and avails said second marking to said view medium while said first portion is in the second orientation.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 6, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Figure 1:
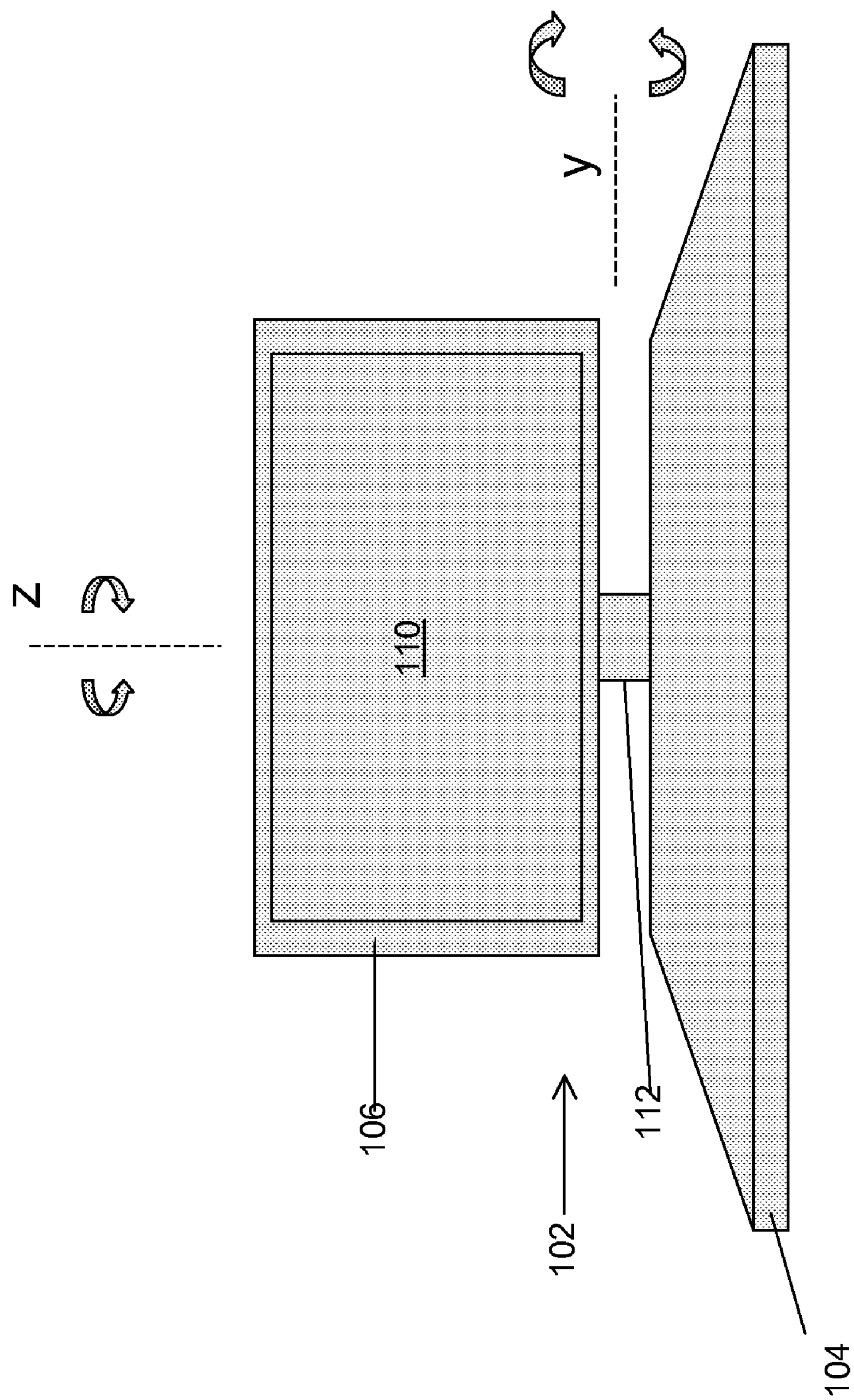
FIG. 1 schematically illustrates in perspective elevational view a convertible tablet/notebook computer in notebook mode.

Referring now to the drawings, FIG. 1 schematically illustrates in perspective elevational view a convertible tablet/notebook computer in notebook mode. As shown (with dimensions not necessarily to scale for the purpose of greater clarity), a monitor/lid portion 106 of a laptop (or, alternatively, portable or notebook) computer 102 is pivotably displaceable with respect to keyboard portion 104 about a "y" axis, or that axis which is parallel in common to longitudinal dimensions of monitor/lid portion 106 and keyboard portion 104. As known, this pivotal displacement about the y-axis can serve to essentially "open" or "close" the computer 102.

Also shown is a dual-swivel hinge 112 which renders the monitor/lid portion 106 pivotably displaceable with respect to keyboard portion 104 about the illustrated "z" axis. As mentioned above, the z-axis is associated with the monitor/lid portion and runs in perpendicular to the y-axis. Thus, here the z-axis is shown as being essentially vertical, but this is only to the extent that monitor/lid portion 106 is also shown as being essentially vertical.

Figure 2:
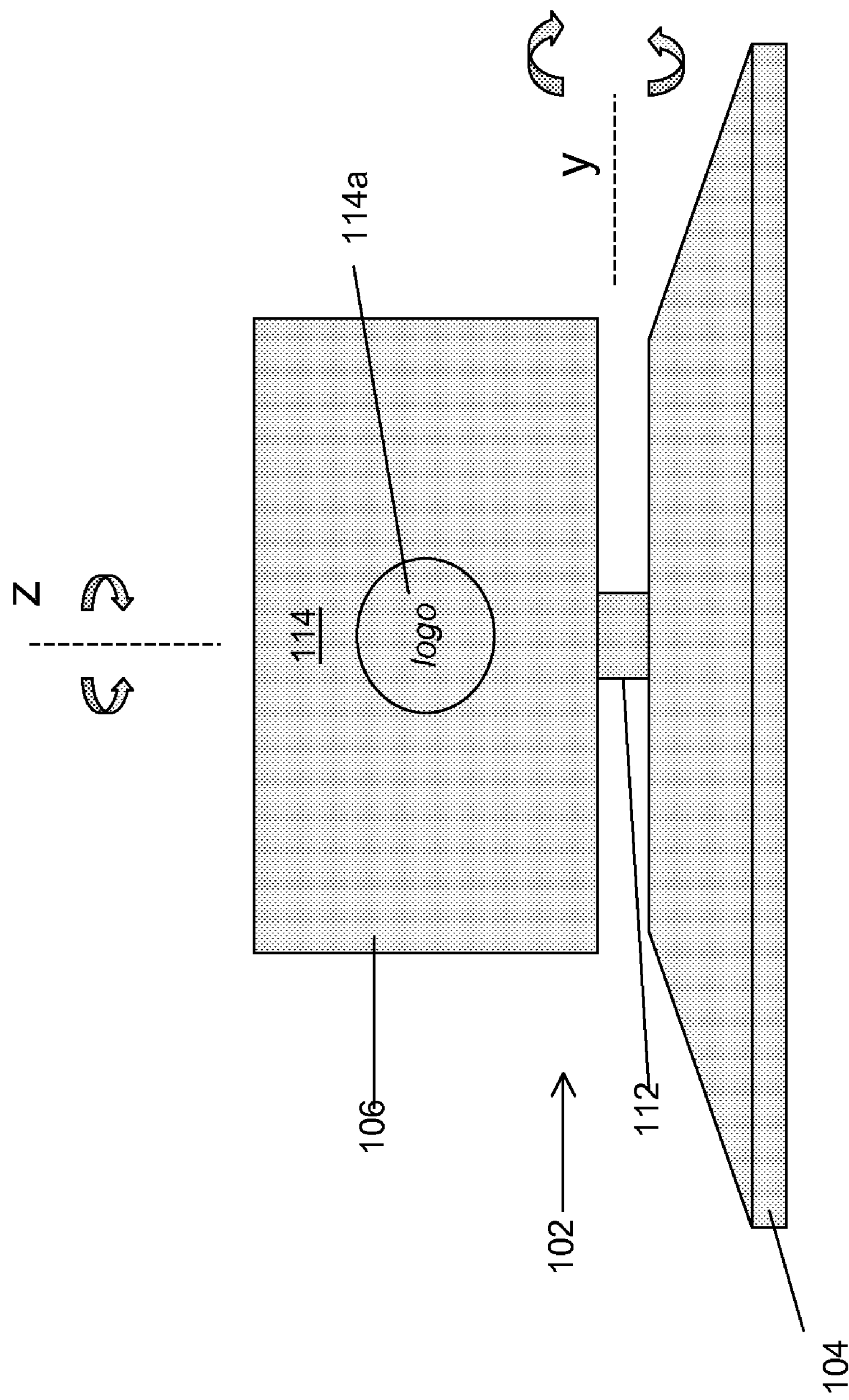
FIG. 2 schematically illustrates the convertible tablet/notebook computer of FIG. 1 in tablet mode.

In FIG. 1, the computer 102 is shown in "notebook" mode, whereby a monitor (or display screen) 110 faces a user along with keyboard portion 104 when the computer 102 is "open" (i.e., when monitor/lid portion 106 has been pivotally displaced away from the keyboard portion 104). On the other hand, FIG. 2 schematically illustrates computer 102 "tablet" mode, whereby a major surface 114 of monitor/lid portion 106 (typically with a logo 114*a*) now faces a user when the computer 102 is open. This surface 114 is disposed oppositely of the monitor 110 from FIG. 1. As such, if the computer 102 were to be "closed" in tablet mode, the surface 114 would be pivotally displaced towards, and more or less brought together with, the keyboard portion 104 such that the monitor 110 would now be disposed at an external surface.

FIGS. 3*a-d* schematically depict various views of the action of dual-swivel hinge 112, in plan view with respect to FIGS. 1 and 2, and in accordance with at least one presently preferred embodiment of the present invention. As shown, dual-swivel hinge 112 is integrated with a main hinge 116 that itself is pivotable about the y-axis (or its own longitudinal axis). As known, main hinge 116 effects a hinged connection between a monitor/lid portion and a keyboard portion (such as those indicated at 106 and 104, respectively, in FIGS. 1 and 2).

Figure 3A:
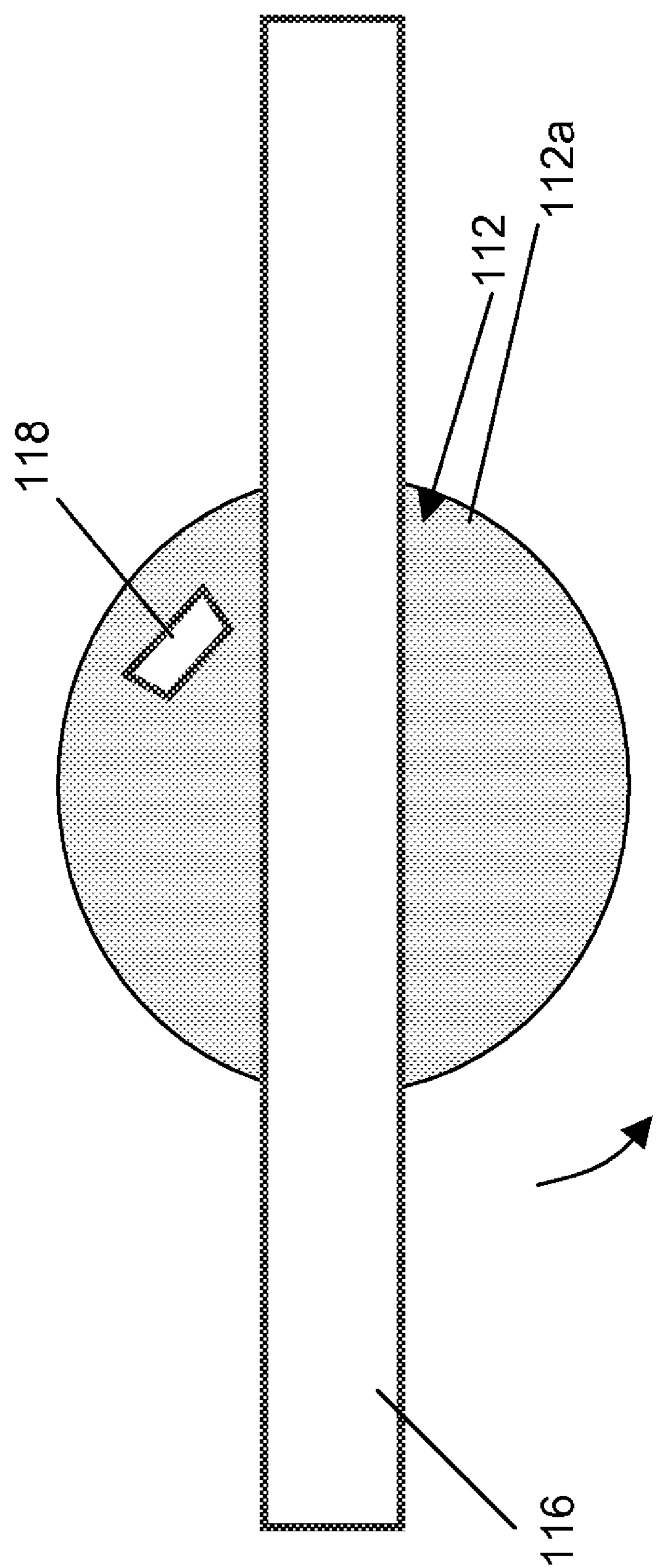
FIGS. 3*a-d* schematically depict various views of the action of a dual-swivel hinge.

Preferably, as shown in FIG. 3*a*, dual-swivel hinge 112 includes at an upper portion thereof a cover disc 112*a* with at hole or window (e.g., hole with a transparent cover) 118 disposed therein as shown. In FIG. 3*a*, hinge 112 is in an initial position, or "first mode", which conceivably could be the aforementioned notebook mode or tablet mode. For the purpose of illustration, in a first transition, hinge 112 will be displaced counterclockwise, as indicated by the arrow, to arrive at a "second mode", or the other of the notebook mode or tablet mode.

Figure 3B:
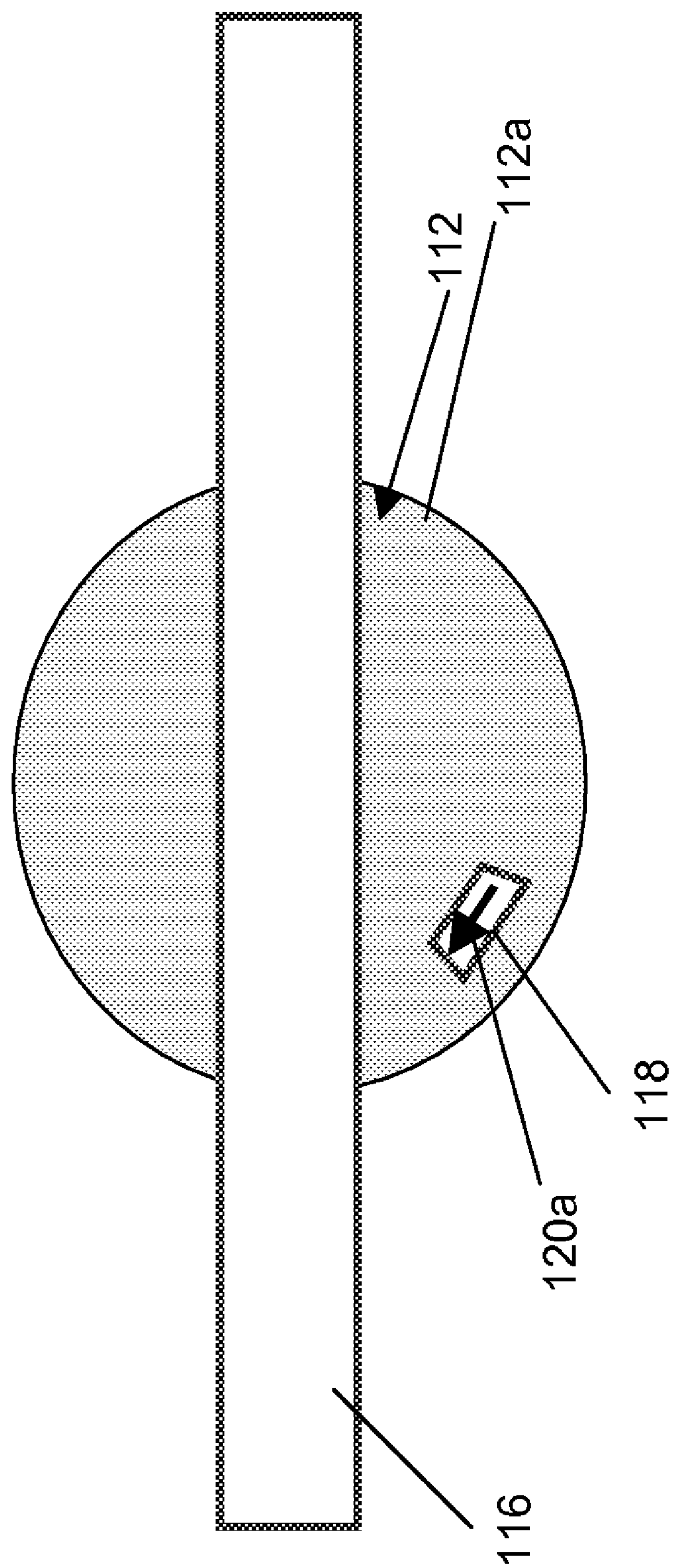

Thus, FIG. 3*b* shows hinges 112 and 116 after being displaced rotationally 180 degrees from the orientation of FIG. 3*a* and thus in "second mode". Preferably, hole/window 118 will reveal underneath an arrow 120*a* that is pointed in a counterclockwise direction. This communicates to a user that the hinge 112 is not to be displaced rotationally any further in the counterclockwise direction about the z-axis.

Figure 3C:
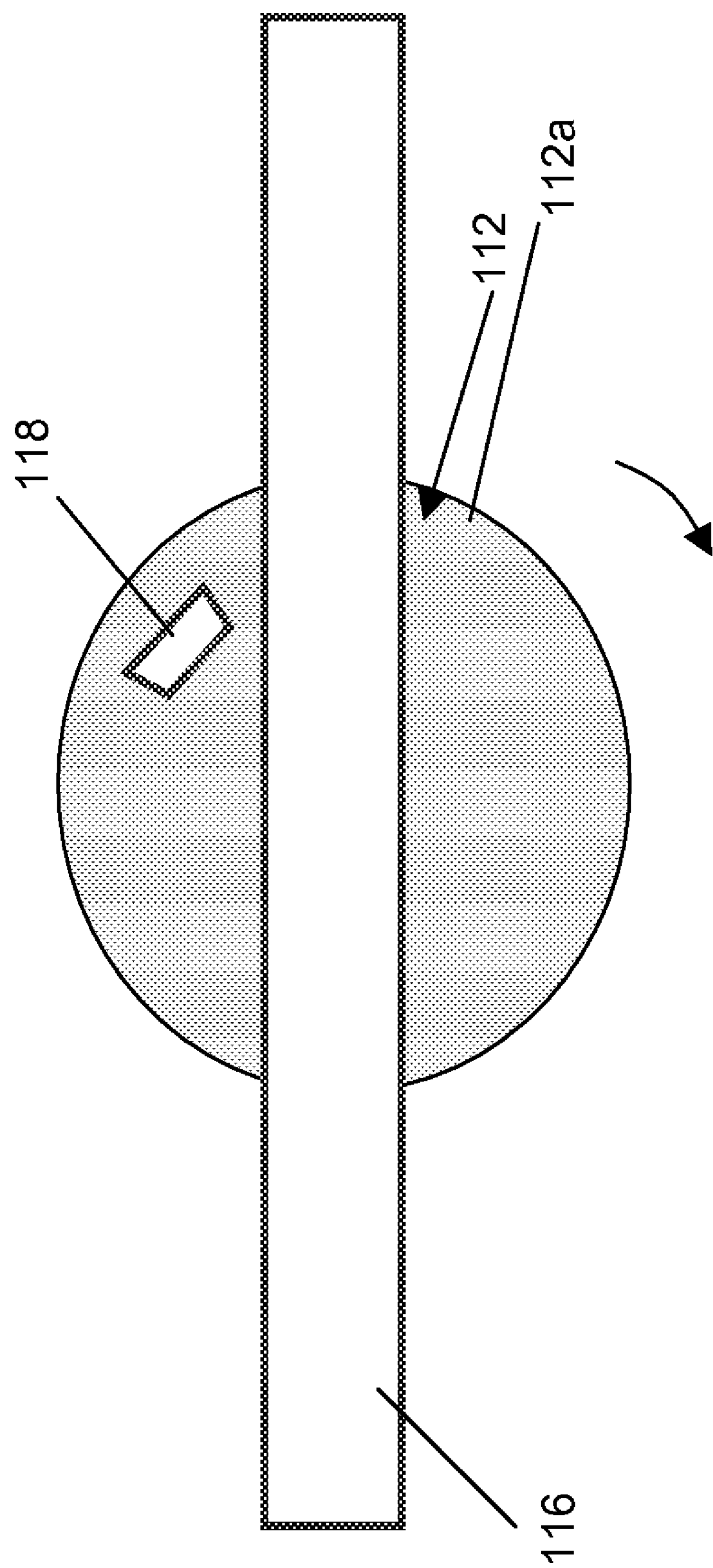

Accordingly, FIG. 3*c* shows hinges 112 and 116 in "first mode" after having reversed the 180 degrees of rotational displacement that took place between the views of FIGS. 3*a* and 3*b*. As such, for the purpose of further illustration, in a second transition, hinge 112 will be displaced clockwise, as indicated by the arrow, to arrive at the "second mode".

Figure 3D:
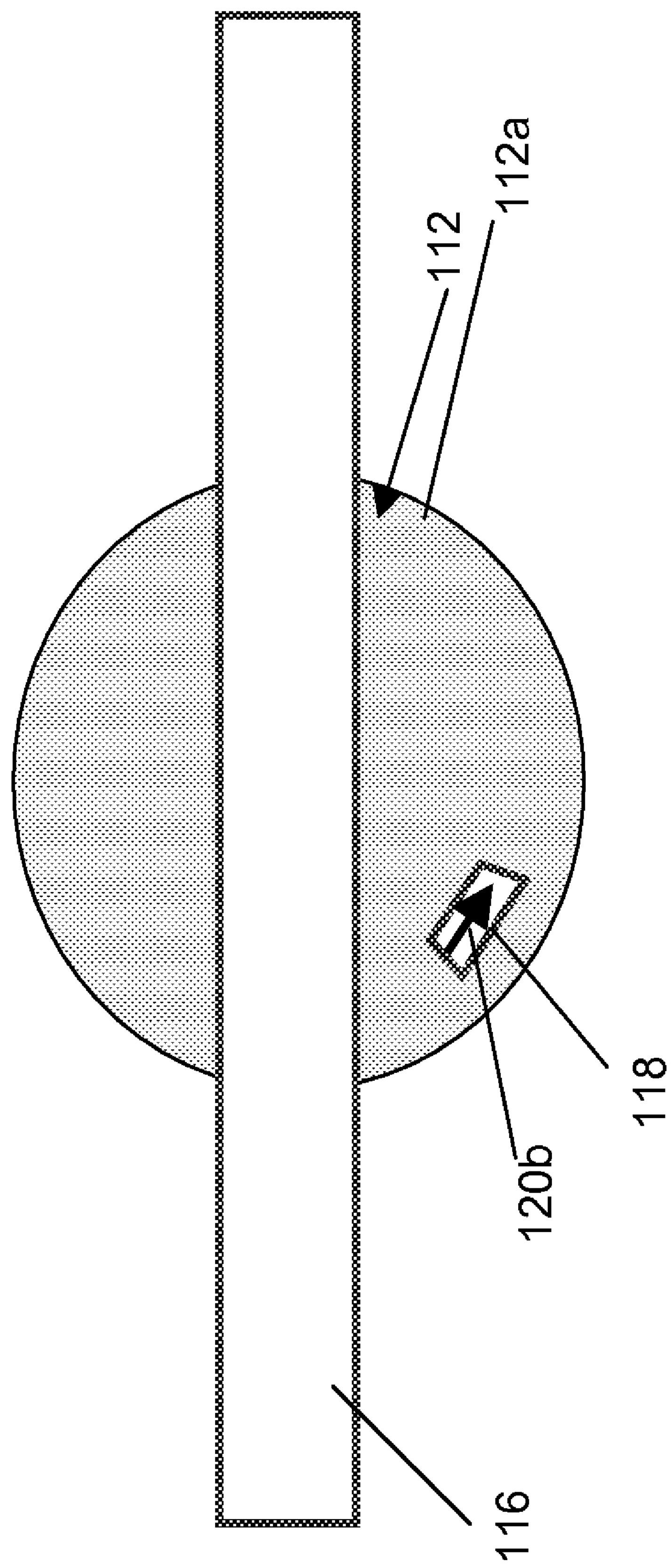

Thus, FIG. 3*d* shows hinges 112 and 116 after now being displaced clockwise 180 degrees from the orientation of FIG. 3*a*, thus to arrive again at "second mode". Preferably, however, hole/window 118 will now reveal underneath an arrow 120*b* that is pointed in a counterclockwise direction, to thereby communicate to a user that the hinge 112 is not to be displaced rotationally any further in the clockwise direction about the z-axis.

Essentially any suitable mechanical arrangement may be employed to permit arrows 120*a/b* to appear as visible in hole/window 118, whereby a tremendous degree of potential confusion will be spared in contrast to those arrangements where static arrows are displayed perpetually, e.g., at an outer surface visible to a user. Further, a tremendous cost savings is enjoyed in comparison to solutions that are not strictly mechanical whereby, e.g., an appropriate clockwise or counterclockwise arrow illuminates to communicate the same information to a user as do the arrows 120*a/b* here.

Accordingly, it should be understood that hole/window 118 and arrows 120*a/b* are presented here by way of an illustrative and non-restrictive example. Analogous arrangements are thus certainly possible within the scope of the embodiments of the present invention; for instance, two windows or holes could take the place of the single hole/window 118 and, for example, each hole/window could reveal respectively a different one of the arrows.

Figure 4:
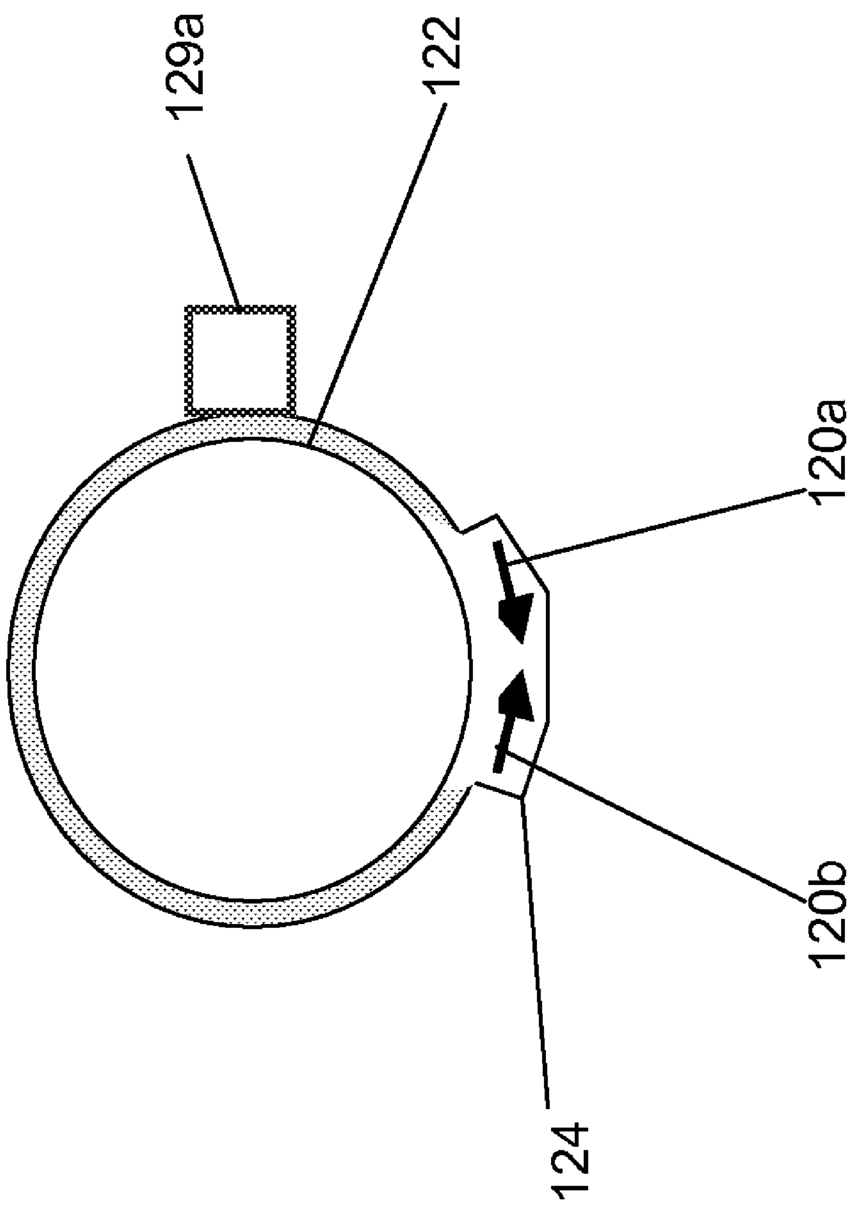
FIG. 4 schematically illustrates in plan view an arrow ring and a stopper.
Figure 5:
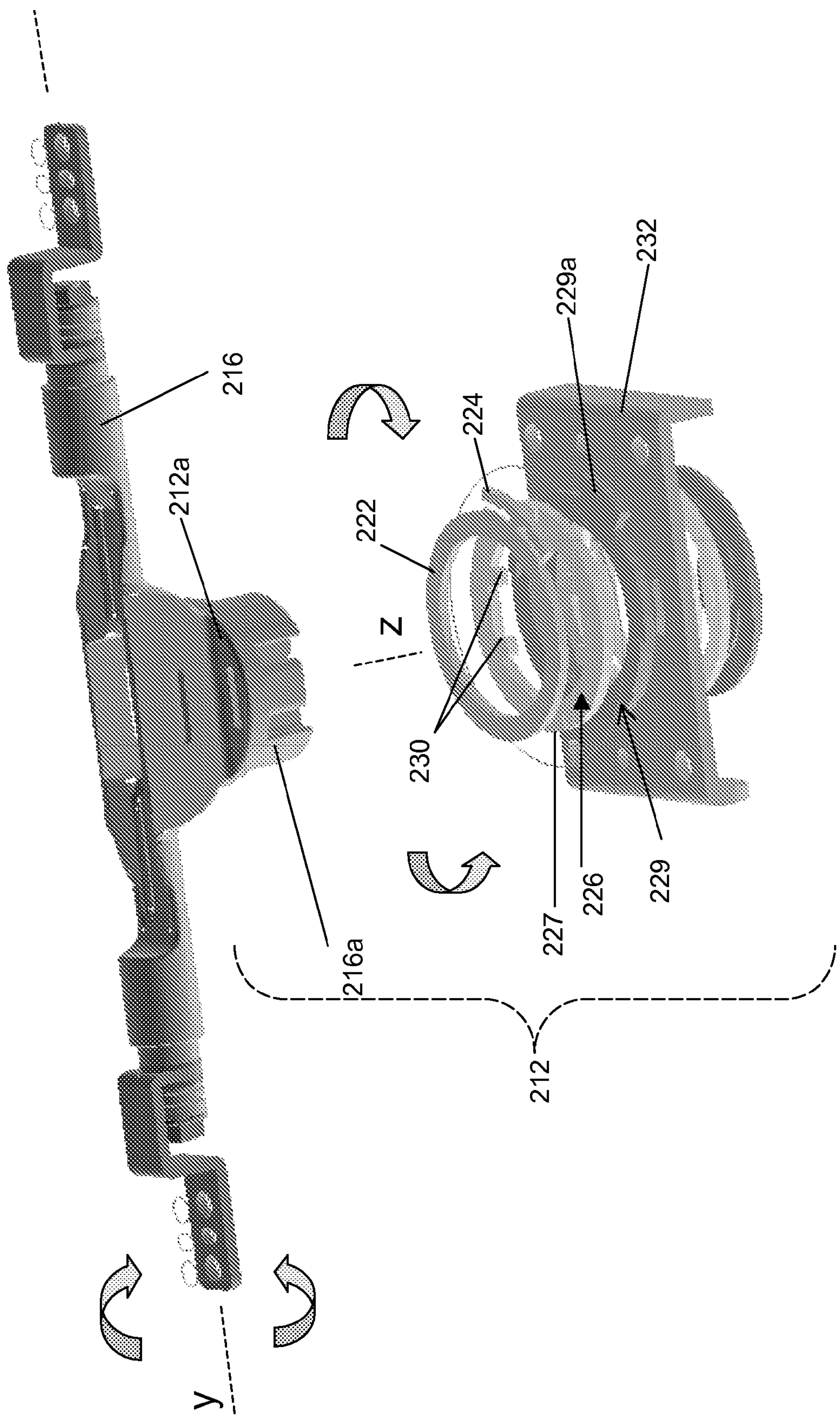
FIG. 5 provides an exploded perspective upper view of a dual-swivel hinge and main hinge.
Figure 6:
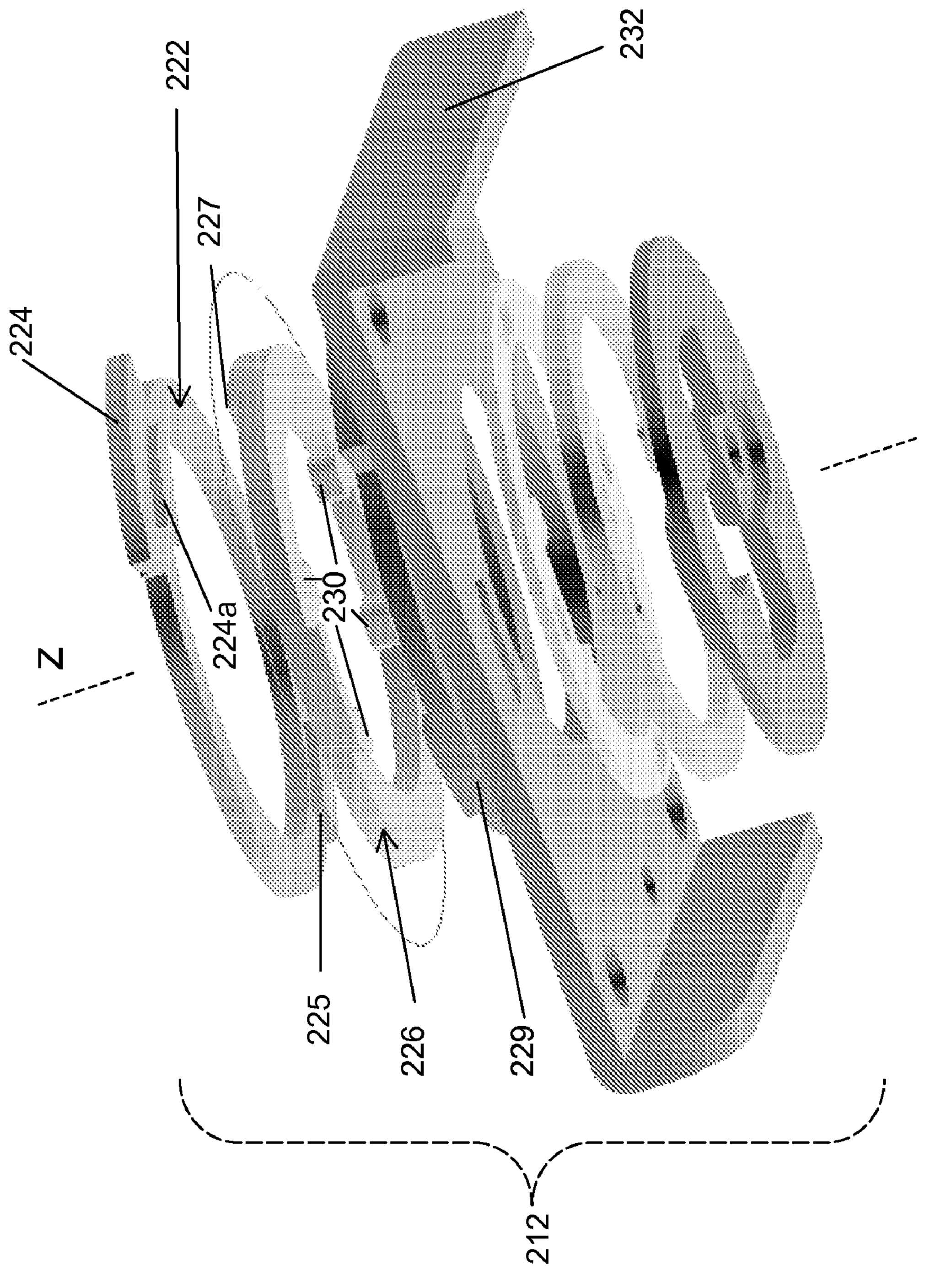
FIG. 6 provides another exploded perspective lower view of the dual-swivel hinge shown in FIG. 5.

The manner via which arrows 120*a/b* appear visible can be undertaken in essentially any suitable manner, and one particularly advantageous manner in accordance with at least one preferred embodiment of the present invention is presented herebelow in connection with FIGS. 4, 5 and 6.

FIG. 4 schematically illustrates in plan view an "arrow ring" 122. Arrow ring 122 may be employed to provide the clockwise and counterclockwise arrows 120*a/b* that become visible through hole or window 118 (FIGS. 3*a-d*). As such, the main ring body can include a flange 124 extending therefrom on which the arrows 120*a/b* are disposed. In the illustrative embodiment shown in FIG. 4, both arrows 120*a/b* are disposed on the flange 124 and, in this case, point towards one another. Via essentially any suitable mechanical arrangement, ring 122 can be engaged by another rotationally displacing component (during rotational movement of hinge 112 from a "first mode" to a "second mode" as discussed with relation to FIGS. 3*a-d*) so that it is thence rotationally displaced itself until one of the arrows 120*a/b* is positioned under a window 118*a/b* (FIGS. 3*a-d*). (Such an example is provided herebelow with respect to FIGS. 5 and 6.) Thence, during return rotational movement of the hinge 112 (FIGS. 3*a*-3*d*) from the "second mode" to the "first mode", the ring can be pushed in the reverse rotational direction and/or remain stationary.

Preferably, there may be provided a stop 129*a* disposed below the arrow ring 122 and which serves to engage flange 124, in either rotational direction, and inhibit further rotational movement of flange 124 (and thus ring 122). This stop 129*a* is different from the aforementioned arrangement for engaging the ring 122 and transferring rotational displacement to the ring 122. FIGS. 5 and 6 herebelow provide more specifics on an arrow ring and stop that can be employed in accordance with the embodiments of the present invention.

FIG. 5 provides an exploded perspective upper view of a dual-swivel hinge and main hinge, while FIG. 6 provides another exploded perspective lower view of the dual-swivel hinge shown in FIG. 5. Reference will now be made to both figures simultaneously.

As shown, a main (or y-axis) hinge component 216 preferably includes hinge elements (not otherwise described herein) that permit a monitor/lid portion of a laptop to pivot with respect to a keyboard portion about the y-axis. Further, an integral extension 216*a* of hinge component 216 forms a portion of, and cooperates with other portions of, dual-swivel hinge 212. With regard to such other portions, it will be noted that dual-swivel hinge 212 preferably includes a series of stacked and coaxial rings that are disposed above and below a mounting plate 232 (itself being integral with a keyboard portion of a laptop). Atop the extension 216 there is preferably an upper disc portion 212*a*, analogous to the disc portion 112*a* described and illustrated with regard to FIGS. 3*a*-3*b*, that includes at least one hole or window analogous to that indicated at 118 in FIGS. 3*a*-3*b* (but which is not otherwise illustrated in FIG. 5).

Among the stacked and coaxial rings, an uppermost one 222 is preferably provided which is analogous to the arrow ring 122 described and illustrated with regard to FIG. 4. This ring 222, likewise, preferably includes a flange 224 that itself has two arrows disposed at an upper surface thereof which may, as shown, point to each other along a circumferential direction. A second ring 226 is preferably disposed below arrow ring 222 and includes teeth 230 which engage with corresponding and mating grooves on extension 216*a* of main hinge component 216. Thus, second ring 226 will preferably be rotationally fixed with respect to extension 216*a*.

As such, second ring 226 preferably includes two protruding portions 227 disposed on an upper annular surface thereof, and these are preferably configured to engage rotationally with a downwardly extending protrusion 225 from arrow ring 222. On the other hand, a downwardly extending protrusion 224*a* preferably protrudes downwardly from flange 224 and as such is disposed radially further away from the central z-axis of rotation than is protrusion 225 and protruding portions 228; thus, protrusion 224*a* will not be engaged by protruding portions 227 but by a stop (232) discussed further below.

Accordingly, while arrow ring 222 will be engaged frictionally by extension 216*a* and second ring 226, thus facilitating a transfer of rotational movement from extension 216*a* to arrow ring 222 (in that arrow ring 222 will be firmly sandwiched between extension 216*a* and second ring 226), the two protruding portions 227 of second ring 226, when undergoing rotational displacement, will at certain junctures engage with downwardly extending protrusion 225 and thence further assist in pushing the arrow ring 222 further rotationally.

On the other hand, downwardly extending protrusion 224*a* plays an important role in managing the displacement of arrow ring 222 and, by extension, the arrows on flange 224, in a manner now to be described.

As shown, a lower ring 229 is preferably disposed atop mounting plate 232. Preferably, lower ring 229 is in fact fixed with respect to plate 232. As such, protrusion 224*a* from the flange 224 of arrow ring 222 is preferably to engage stop 229*a* when, after rotational displacement in either direction, protrusion 224*a* comes into contact with stop 229*a*. Accordingly, further rotational displacement of extension 216*a* and second ring 226 in either direction at that point will not serve to transfer rotational displacement to arrow ring 222 thus ensuring, e.g., that one arrow or another can become visible in a hole/window of cover disc portion 212*a*. Particularly, if arrow ring 222 is being displaced clockwise, then stop 229*a* will be engaged and the counterclockwise arrow will show in the hole/window. Likewise, if arrow ring 222 is being displaced counterclockwise, then stop 229*a* will be engaged and the clockwise arrow will show in the hole/window. Accordingly, the user will be effectively apprised of the return rotational direction that needs to be traversed in order to inhibit further rotational movement that might cause damage to computer components.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer comprising:

a lid portion;

a base portion;

a dual-swivel hinge interconnecting said lid portion and said base portion, said hinge comprising:

a first portion which is rotationally fixed with respect to said lid portion; and a second portion which is rotationally fixed with respect to said base portion;

said first portion being rotationally displaceable with respect to said second portion between a first orientation and a second orientation about a central axis of said hinge, the first and second orientations differing in rotational position with respect to the central axis;

a marking arrangement comprising:

a rotationally displaceable arrow ring comprising a single flange having disposed thereon a first marking associated with the first orientation; and a second marking associated with the second orientation;

said single flange being selectively displaced to avail said first marking while said first portion is in the first orientation and avail said second marking while said first portion is in the second position.

2. The computer according to claim 1, wherein said computer comprises a laptop computer.

3. The computer according to claim 2, wherein:

said laptop computer comprises a convertible notebook/tablet computer;

the first orientation corresponds to one of: a notebook mode of said laptop computer and a tablet mode of said laptop computer;

the second orientation corresponds to the other one of: a notebook mode of said laptop computer and a tablet mode of said laptop computer.

4. The computer according to claim 1, wherein said lid portion comprises a monitor and said base portion comprises a keyboard.

5. The computer according to claim 1, wherein the first and second orientations are offset from one another by a rotational distance of about 180 degrees.

6. The computer according to claim 1, wherein said single flange is rotatably mounted about the central axis.

7. The computer according to claim 6, further comprising:

means for transferring rotational displacement from said first portion to said single flange; and a stop element rotationally fixed with respect to said second portion;

said stop element acting to inhibit rotational displacement of said single flange relative to said first portion such that:

while said first portion is in the first orientation, said first marking is availed and said second marking is not availed; and while said first portion is in the second orientation, said second marking is availed and said first marking is not availed.

8. The computer according to claim 1, wherein:

said first marking comprises a first arrow; and said second marking comprises a second arrow;

said first and second arrows each corresponding to a predetermined return direction of rotational displacement when said first portion is in said second orientation.

9. The computer according to claim 8, wherein said first and second arrows point in opposite rotational directions.

10. A dual-swivel hinge comprising:

a first portion; and a second portion;

said first portion being rotationally displaceable with respect to said second portion between a first orientation and a second orientation about a central axis of said hinge, the first and second orientations differing in rotational position with respect to the central axis;

a marking arrangement comprising:

a view medium;

a rotationally displaceable arrow ring comprising a single flange having disposed thereon a first marking associated with the first orientation and a second marking associated with the second orientation; said rotationally displaceable arrow ring avails said first marking to said view medium while said first portion is in the first orientation; and avails said second marking to said view medium while said first portion is in the second orientation.

11. The hinge according to claim 10, wherein the first and second orientations are offset from one another by a rotational distance of about 180 degrees.

12. The hinge according to claim 10, wherein:

said hinge comprises a cover surface; and said view medium comprises an aperture rendering visible an element disposed below said cover surface.

13. The hinge according to claim 12, wherein:

said single flange avails said first marking to said view medium while said first portion is in the first orientation; and said single flange further avails said second marking to said view medium while said first portion is in the second orientation.

14. The hinge according to claim 13, wherein:

said single flange is rotatably mounted about the central axis;

said availing arrangement further comprises:

means for transferring rotational displacement from said first portion to said single flange; and a stop element rotationally fixed with respect to said second portion;

said stop element acting to inhibit rotational displacement of said single flange relative to said first portion such that:

while said first portion is in the first orientation, said first marking is availed to said view medium and said second marking is not availed to said view medium; and while said first portion is in the second orientation, said second marking is availed to said view medium and said first marking is not availed to said view medium.

15. The hinge according to claim 10, wherein:

said first marking comprises a first arrow; and said second marking comprises a second arrow;

said first and second arrows each corresponding to a predetermined return direction of rotational displacement when said first portion is in said second orientation;

said first and second arrows pointing in opposite rotational directions.

* * * * *